(12) United States Patent
Kraemer

(10) Patent No.: US 9,062,569 B2
(45) Date of Patent: Jun. 23, 2015

(54) SYSTEMS, METHODS, AND APPARATUS FOR REGENERATING A CATALYTIC MATERIAL

(75) Inventor: Gilbert Otto Kraemer, Greer, SC (US)

(73) Assignee: General Electric Company, Schenectady, NY (US)

( * ) Notice: Subject to any disclaimer, the term of this patent is extended or adjusted under 35 U.S.C. 154(b) by 483 days.

(21) Appl. No.: 12/915,241

(22) Filed: Oct. 29, 2010

(65) Prior Publication Data

US 2012/0102970 A1 May 3, 2012

(51) Int. Cl.

| F01K 23/10 | (2006.01) |
|---|---|
| F01K 17/02 | (2006.01) |
| F23G 7/07 | (2006.01) |
| F23J 15/02 | (2006.01) |
| F23J 15/08 | (2006.01) |

(52) U.S. Cl.
CPC .............. *F01K 23/10* (2013.01); *F01K 17/02* (2013.01); *F23G 7/07* (2013.01); *F23J 15/02* (2013.01); *F23J 15/08* (2013.01); *F23J 2215/10* (2013.01); *Y02E 20/12* (2013.01); *Y02E 20/16* (2013.01)

(58) Field of Classification Search
CPC ........... F01K 17/02; F01K 23/10; F23G 7/07; F23J 15/08; F23J 15/02; F23J 2215/10; Y02E 20/16; Y02E 20/12
USPC ........ 60/39.182, 39.181, 39.52, 39.5, 39.511, 60/777, 723
See application file for complete search history.

(56) References Cited

U.S. PATENT DOCUMENTS

| 2,076,287 A * | 4/1937 | Arnold ..................... 237/12.3 B |
|---|---|---|
| 4,482,637 A | 11/1984 | Buss et al. |
| 4,572,110 A | 2/1986 | Haeflich |
| 5,451,558 A | 9/1995 | Campbell et al. |
| 5,658,541 A | 8/1997 | Matros et al. |
| 5,844,005 A | 12/1998 | Bauman et al. |
| 6,037,290 A | 3/2000 | Wachs et al. |

(Continued)

FOREIGN PATENT DOCUMENTS

| CN | 1143335 A | 2/1997 |
|---|---|---|
| CN | 1269461 A | 10/2000 |

(Continued)

OTHER PUBLICATIONS

Search Report and Written Opinion from FR Application No. 1159719 dated Apr. 29, 2013.

(Continued)

*Primary Examiner* — Thomas Denion
*Assistant Examiner* — Vikansha Dwivedi
(74) *Attorney, Agent, or Firm* — Armstrong Teasdale LLP

(57) ABSTRACT

A steam generator coupled in flow communication downstream from a combustion device that produces a flow of exhaust gases includes a heating device configured to heat the exhaust gases that include oxides of nitrogen ($NO_x$), and an oxidation catalyst coupled downstream from the heating device. The oxidation catalyst facilitates reducing an amount of $NO_x$ in the exhaust gases channeled into the oxidation catalyst at a first temperature that is less than a thermal regeneration temperature for a catalytic material and at a second temperature that is approximately equal to at least the thermal regeneration temperature such that the catalytic material is simultaneously regenerated.

3 Claims, 5 Drawing Sheets

(56) References Cited

U.S. PATENT DOCUMENTS

| | | | |
|---|---|---|---|
| 6,055,803 A * | 5/2000 | Mastronarde | 60/783 |
| 6,311,480 B1 | 11/2001 | Suzuki et al. | |
| 6,548,030 B2 | 4/2003 | Heyse et al. | |
| 6,900,151 B2 | 5/2005 | Soled et al. | |
| 6,993,901 B2 | 2/2006 | Shirakawa | |
| 7,168,242 B2 | 1/2007 | Uematsu et al. | |
| 7,229,597 B2 | 6/2007 | Patchett et al. | |
| 7,331,170 B2 | 2/2008 | Shimoda | |
| 7,380,402 B2 * | 6/2008 | Rebhan et al. | 60/776 |
| 7,587,891 B2 | 9/2009 | Nam | |
| 7,721,532 B2 | 5/2010 | Liu et al. | |
| 7,784,276 B2 | 8/2010 | Ono | |
| 7,788,910 B2 | 9/2010 | McCabe et al. | |
| 7,832,201 B2 | 11/2010 | Bremm et al. | |
| 8,006,486 B2 | 8/2011 | Torisaka | |
| 8,061,125 B2 * | 11/2011 | Yoshida et al. | 60/286 |
| 8,186,142 B2 * | 5/2012 | Narayan et al. | 60/39.182 |
| 8,220,274 B2 * | 7/2012 | Bono et al. | 60/772 |
| 8,336,294 B2 | 12/2012 | Fukuda et al. | |
| 2001/0032458 A1 * | 10/2001 | Suzuki et al. | 60/288 |
| 2008/0148715 A1 * | 6/2008 | Osumi et al. | 60/295 |
| 2008/0309087 A1 | 12/2008 | Evulet et al. | |
| 2009/0282803 A1 | 11/2009 | Bono et al. | |
| 2010/0031625 A1 * | 2/2010 | Narayan et al. | 60/39.5 |

FOREIGN PATENT DOCUMENTS

| | | |
|---|---|---|
| CN | 1523207 A | 8/2004 |
| CN | 1541300 A | 10/2004 |
| CN | 1791736 A | 6/2006 |
| CN | 1832794 A | 9/2006 |
| CN | 1910352 A | 2/2007 |
| CN | 1982663 A | 6/2007 |
| CN | 101087640 A | 12/2007 |
| CN | 101292078 A | 10/2008 |
| CN | 101302953 A | 11/2008 |
| CN | 101324203 A | 12/2008 |
| CN | 101449037 A | 6/2009 |
| CN | 101776005 A | 7/2010 |
| EP | 2241732 A1 | 10/2010 |
| JP | S59206611 A | 11/1984 |
| JP | H01155007 A | 6/1989 |

OTHER PUBLICATIONS

Unofficial English Translation of Chinese Office Action issued in connection with corresponding CN Application No. 201110344980.3 on Jun. 11, 2014.

* cited by examiner

US 9,062,569 B2

SYSTEMS, METHODS, AND APPARATUS FOR REGENERATING A CATALYTIC MATERIAL

BACKGROUND OF THE INVENTION

The embodiments described herein relate generally to emissions treatment systems and, more particularly, to a heat recovery steam generator for use in reducing $NO_2$ formation in the exhaust path of a combustion system and for regenerating a catalytic material that facilitates the reduction in $NO_2$ formation.

During the combustion of natural gas and liquid fuels, pollutants such as, but not limited to, carbon monoxide (CO), unburned hydrocarbons (UHC), and oxides of nitrogen ($NO_x$) emissions, may be formed and/or emitted into an ambient atmosphere. In general, CO and UHC may be formed during combustion conditions at lower temperatures and/or during combustion conditions when an insufficient amount of time to complete a reaction is available. In contrast, $NO_x$ is generally formed during combustion conditions at higher temperatures. At least some known pollutant emission sources include industrial boilers and furnaces, reciprocating engines, gas turbine engines, and/or steam generators.

Modern air quality regulations increasingly mandate reduced emission levels for power generation plants, while also requiring increased fuel efficiency requirements. To comply with stringent emission control standards, it is desirable to control $NO_x$ emissions by suppressing the formation of $NO_x$ emissions. Oxides of nitrogen include nitric oxide (NO) and nitrogen dioxide ($NO_2$), which is known to produce a visible yellow plume from exhaust stacks and that is alleged to contribute to the creation of "acid rain." However, known combustion controls may provide only limited emissions control and may prove inadequate in satisfying the increased standards and the often-conflicting goals, such that further improvements of post-combustion exhaust gas treatment systems are desirable.

One known technology for use in controlling $NO_x$ in stack emissions is selective catalytic reduction (SCR). In an SCR system, flue gases from power generation plants often have a net oxidizing effect due to a high proportion of oxygen that is provided to ensure adequate combustion of a hydrocarbon fuel. Thus, $NO_x$ that is present in the flue gas may be reduced to nitrogen and water with great difficulty. An SCR element may be used to mix anhydrous ammonia with the flue gas, and the gases are channeled over a suitable reduction catalyst at a suitable temperature prior to being released into the atmosphere. However, the reaction rate over the catalyst is dependent on the inlet gas temperature as such the rate of $NO_x$ destruction is insufficient until the flue gas is heated to the suitable temperature. Accordingly, during transient phases, such as during startup operations, the SCR element generally does not reduce the $NO_x$ to a desired level as the flue gas temperature is to low.

Another approach to $NO_x$ removal is adsorption by a downstream medium and subsequent removal of the $NO_x$ from the downstream medium. For example, $NO_2$ is relatively water-soluble, which enables its removal by adsorption using a downstream aqueous solution in a flue gas desulfurization (FGD) unit. However, NO is less soluble than $NO_2$ and other $N_xO_y$ compounds in such solutions. Accordingly, power generation systems can use an oxidation catalyst to oxidize NO to a more soluble $N_xO_y$ component, such as $NO_2$ and $N_2O_5$. Moreover, NO oxidation is generally at its most effective at low temperatures. However, sulfur dioxides ($SO_x$) and other contaminants can foul the oxidation catalyst over time, which reduces the NO oxidation yield.

BRIEF DESCRIPTION OF THE INVENTION

In one aspect, a steam generator is coupled in flow communication downstream from a combustion device that produces a flow of exhaust gases. The steam generator includes a heating device configured to heat the exhaust gases that include oxides of nitrogen ($NO_x$), and an oxidation catalyst coupled downstream from the heating device. The oxidation catalyst facilitates reducing an amount of $NO_x$ in the exhaust gases channeled into the oxidation catalyst at a first temperature that is less than a thermal regeneration temperature for a catalytic material and at a second temperature that is approximately equal to at least the thermal regeneration temperature such that the catalytic material is simultaneously regenerated.

In another aspect, a combined cycle power plant includes a gas turbine engine configured to combust a fuel in air to produce shaft power and a flow of exhaust gases including oxides of nitrogen ($NO_x$), and a heat recovery steam generator (HRSG) coupled in flow communication with the gas turbine engine. The HRSG includes a heating device configured to heat the exhaust gases, and an oxidation catalyst coupled downstream from the heating device, wherein the oxidation catalyst facilitates reducing an amount of $NO_x$ in the exhaust gases channeled into the oxidation catalyst at a first temperature that is less than a thermal regeneration temperature for a catalytic material and at a second temperature that is approximately equal to at least the thermal regeneration temperature such that the catalytic material is simultaneously regenerated.

In another aspect, a method is provided for reducing emissions in a flow of exhaust gases generated by a gas turbine engine, the flow of exhaust gases including oxides of nitrogen ($NO_x$). The method includes operating an oxidation catalyst at a first temperature to facilitate reducing an amount of $NO_x$ in the exhaust gases that are channeled into the oxidation catalyst, wherein the first temperature is less than a thermal regeneration temperature for a catalytic material. The method also includes measuring an efficiency of the oxidation catalyst at the first temperature, comparing the efficiency of the oxidation catalyst to a threshold value, and based on the comparison, selectively activating a heating device to increase a temperature of the exhaust gases to a second temperature to facilitate regenerating the catalytic material.

DETAILED DESCRIPTION OF THE INVENTION

Figure 1:
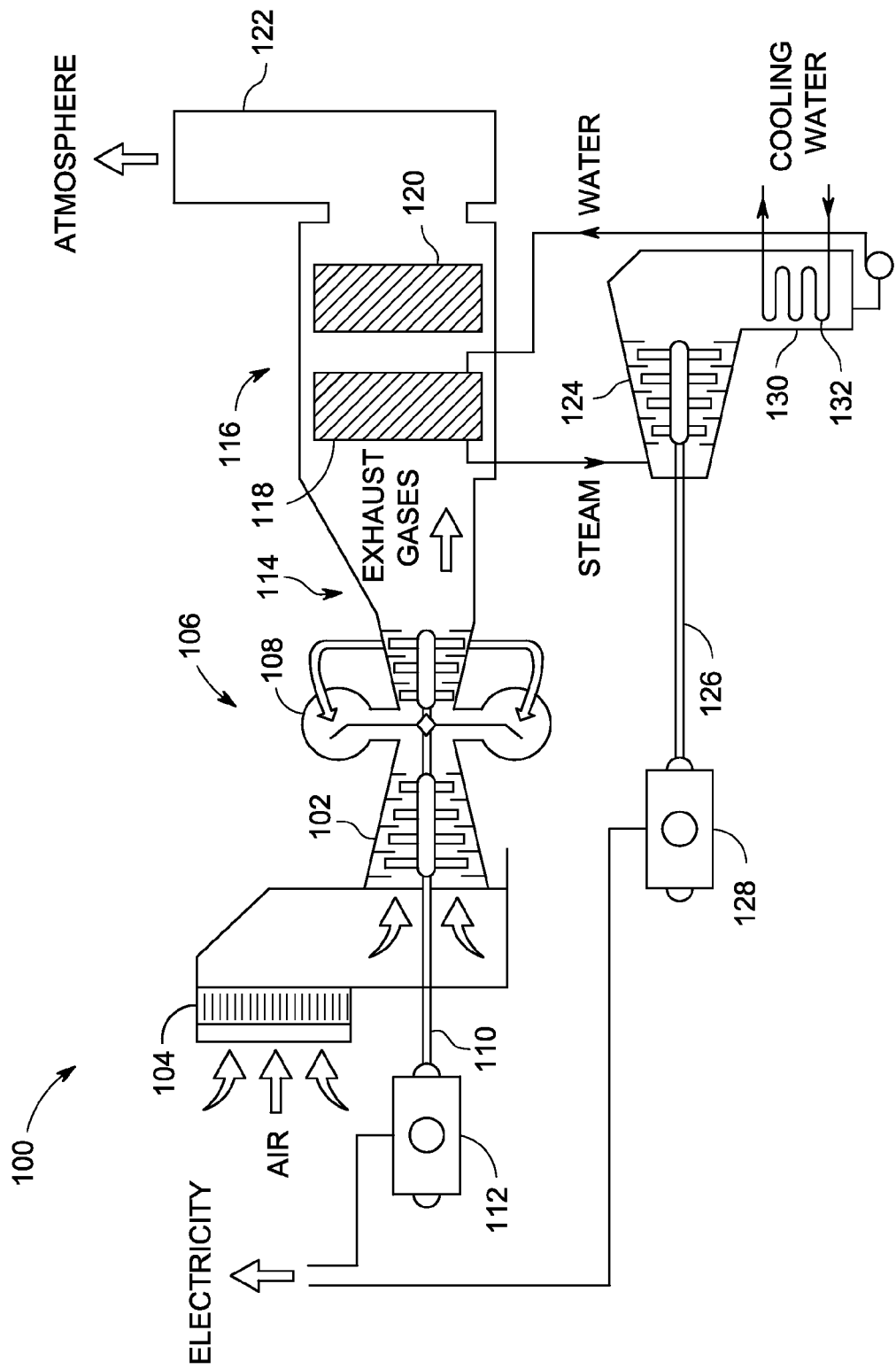
FIG. 1 a simplified schematic diagram of an exemplary combined cycle power plant.

FIG. 1 a simplified schematic diagram of an exemplary combined cycle power plant 100. In the exemplary embodiment, power plant 100 includes a compressor 102 including an air intake 104 that receives air. Compressor 102 is coupled to a gas turbine engine 106 that includes one or more combustion chambers 108. Compressor 102 compresses air received via air intake 104 and channels the compressed air into combustion chambers 108, wherein the compressed air is mixed with fuel and ignited to supply gas turbine engine 106 with hot combustion gases for driving a first shaft 110. First shaft 110 is coupled to a first generator 112, and causes first generator 112 to generate electricity. Moreover, gas turbine engine 106 discharges exhaust gases into an exhaust duct 114, including, for example and not by way of limitation, oxides of nitrogen ($NO_x$), carbon monoxide (CO), and unburned hydrocarbons.

In the exemplary embodiment, power plant 100 also includes a heat recovery steam generator (HRSG) 116 that is coupled in flow communication to gas turbine engine 106. Specifically, HRSG 116 is coupled to gas turbine engine 106 via exhaust duct 114 such that HRSG 116 receives the exhaust gases discharged from gas turbine engine 106. In the exemplary embodiment, HRSG 116 includes one or more heat exchangers 118 and emissions treatment equipment 120. Heat exchangers 118 extract heat from the exhaust gases, and the heat is used to generate steam. Emissions treatment equipment 120 processes the exhaust gases, and the processed exhaust gases are subsequently released to the atmosphere via an exhaust stack 122.

A steam turbine 124 is coupled to HRSG 116 such that steam generated by heat exchangers 118 is channeled into steam turbine 124 for use in driving rotation of a second shaft 126. Second shaft 126 is also coupled to a second generator 128, and causes second generator 128 to generate electricity. The spent steam is then channeled into a condenser 130 that includes a plurality of tube bundles 132. Cooling water channeled through tube bundles 132 cools the steam such that the steam condenses into water. The water is then channeled back to heat exchangers 118.

Figure 2:
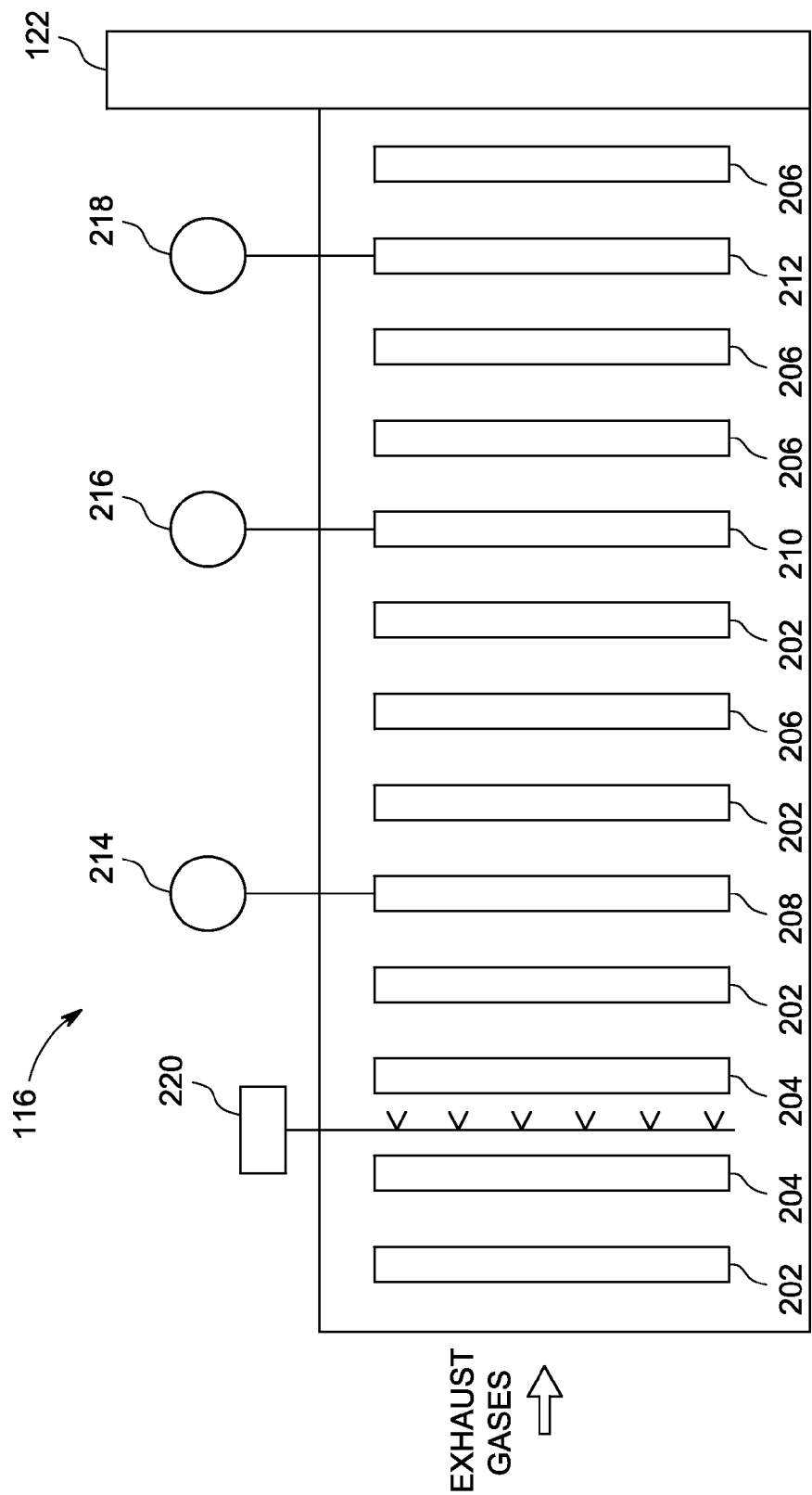
FIG. 2 is a block schematic diagram of an exemplary heat recovery steam generator (HRSG) that may be used with the combined cycle power plant shown in FIG. 1.

FIG. 2 is a block schematic diagram of HRSG 116. In the exemplary embodiment, HRSG 116 receives a flow of exhaust gases discharged from gas turbine engine 106 (shown in FIG. 1) via exhaust duct 114 (shown in FIG. 1). Moreover, in the exemplary embodiment, heat exchangers 118 include a plurality of superheater heat exchangers 202, a plurality of reheater heat exchangers 204, and a plurality of economizer heat exchangers 206. HRSG 116 also includes a high pressure evaporator 208, an intermediate pressure evaporator 210, and a low pressure evaporator 212 that each produce steam using the heat contained in the exhaust gases. Each evaporator 208, 210, and 212 is coupled to a respective pressure drum. In the exemplary embodiment, high pressure evaporator 208 is coupled to a high pressure drum 214, intermediate pressure evaporator 210 is coupled to an intermediate pressure drum 216, and low pressure evaporator 212 is coupled to a low pressure drum 218. HRSG 116 also includes at least one duct burner 220 that supplies heat into the exhaust gas flow to enhance steam production output. Accordingly, in the exemplary embodiment, HRSG 116 generates steam at a plurality of different pressures using high pressure drum 214, intermediate pressure drum 216, and low pressure drum 218. Moreover, in the exemplary embodiment, each pressure drum 214, 216, and 218 routes the pressurized steam to a different steam turbine (not shown). In an alternative embodiment, each pressure drum 214, 216, and 218 channels the pressurized steam to a single steam turbine, such as steam turbine 124 (shown in FIG. 1). In the exemplary embodiment, emissions treatment equipment 120 (shown in FIG. 1) is coupled among heat exchangers 202, 204, and 206, evaporators 208, 210, and 212, and duct burners 220 to facilitate reducing an amount of contaminants entrained within the flow of exhaust gases. In an alternative embodiment, emissions treatment equipment 120 is positioned in the flow of exhaust gases downstream from heat exchangers 118.

Figure 3:
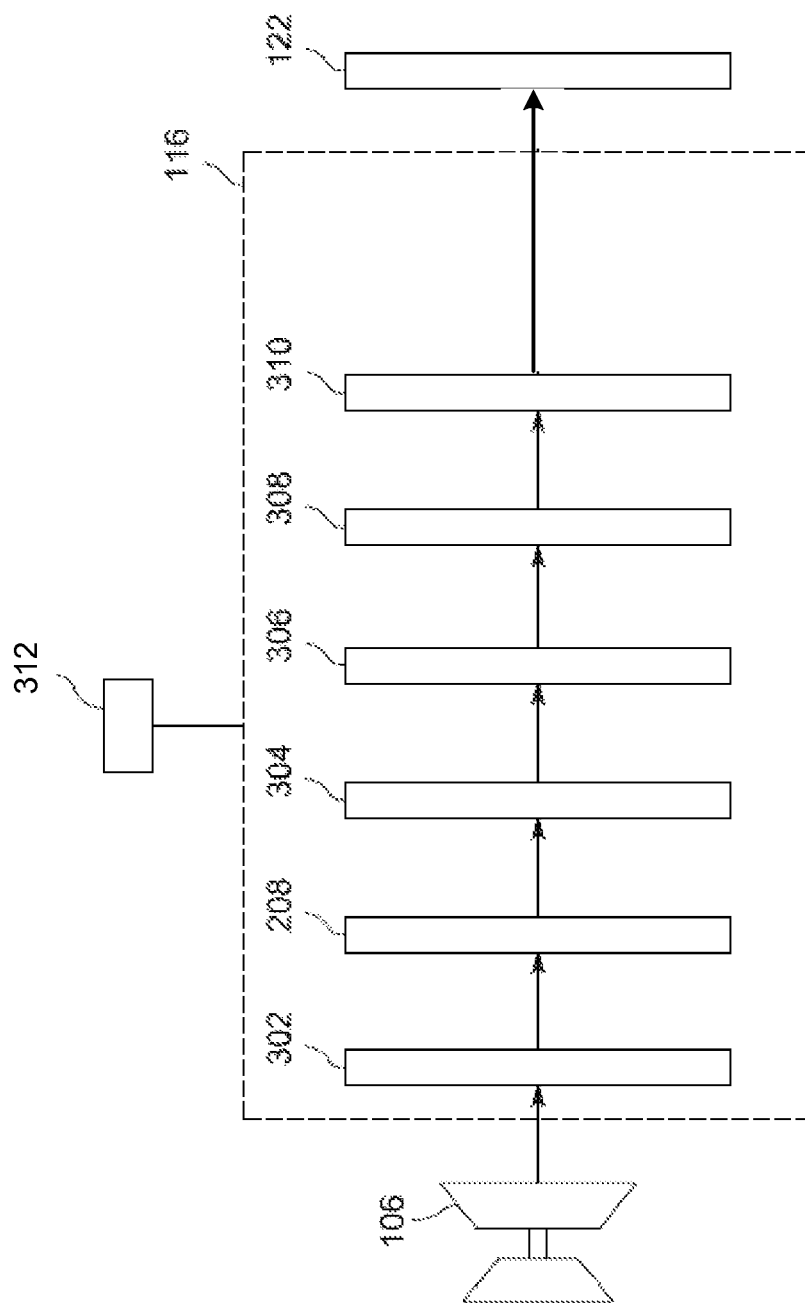
FIG. 3 is a simplified block diagram of the HRSG shown in FIG. 2.

FIG. 3 is a simplified block diagram and an exemplary emissions profile for HRSG 116. As shown in FIG. 3, HRSG 116 includes a duct burner 302 that elevates a temperature of the exhaust gases after the exhaust gases have been discharged from gas turbine engine 106 via exhaust duct 114 (shown in FIG. 1). High pressure evaporator 208 is coupled in flow communication downstream from duct burner 302, and also raises the temperature of the exhaust gases. For example, in one embodiment, duct burner 302 and high pressure evaporator 208 receive the exhaust gases at a temperature of approximately 1200° Fahrenheit (° F.). In the example, duct burner 302 and high pressure evaporator 208 heat the exhaust gases to a temperature above approximately 1200° F. Moreover, in the exemplary embodiment, a high pressure heat exchanger 304 is coupled in flow communication downstream from high pressure evaporator 208 to facilitate cooling the exhaust gases to between approximately 400° F. and approximately 650° F.

In the exemplary embodiment, a heating device 306 is coupled in flow communication downstream from high pressure heat exchanger 304 to selectively increase the temperature of the exhaust gases to facilitate regeneration of an oxidation catalyst. More specifically, in one embodiment, heating device 306 is a second duct burner that heats the exhaust gases to a temperature of between approximately 700° F. and approximately 1250° F. to enable regeneration of an oxidation catalyst within a desired time frame. For example, heating the exhaust gases to a temperature between approximately 700° F. and approximately 1250° F. facilitates regeneration of the oxidation catalyst within approximately two hours. Moreover, second duct burner 306 may be configured to heat the exhaust gases to a temperature between approximately 400° F. and approximately 650° F. to facilitate NO oxidation. The second duct burner may be any suitable duct burner that facilitates low speed and/or low load operation during transient operation of gas turbine engine 106 (shown in FIG. 1) and/or HRSG 116 (shown in FIGS. 1-3). For example, in one embodiment, the second duct burner includes a substantially circular housing that defines a fuel inlet that is coupled to a fuel source. The second duct burner also includes a plurality of fuel circuits that are coupled in flow communication with the fuel inlet, and upper and lower flanges that extends outward from the housing to facilitate channeling the flow of exhaust gases under the second duct burner. The upper lower flanges are each positioned to enhance the flow of exhaust gases over and under the second duct burner at a desired velocity that facilitates the flow of exhaust gases being exposed to flames emitted by the second duct burner for a desired amount of time.

In an alternative embodiment, heating device 306 is a steam-based heating element that is coupled in flow communication downstream from high pressure heat exchanger 304 to selectively increase the temperature of the exhaust gases. For example, the steam-based heating element may include a plurality of superconducting heat transfer tubes that are arranged to form a panel. Exemplary heat transfer tubes include, but are not limited to only including, Qu Tubes commercially available from New Qu Energy Ltd., Hong Kong, China. Moreover, a steam source (not shown) channels steam past the heat transfer tubes, which absorb heat energy from the steam. The exhaust gases from gas turbine engine 106 (shown in FIG. 1) is channeled through the heat transfer tubes, where the exhaust gases absorb at least a portion of the heat energy from the heat transfer tubes. Exemplary steam sources include, but are not limited to only including, steam turbine 124 (shown in FIG. 1), a supplemental boiler (not shown), a pressure drum, such as high pressure drum 214, intermediate pressure drum 216, and/or low pressure drum 218 (each shown in FIG. 2), or any other suitable steam source that is capable of providing steam having sufficient heat energy to the steam-based heating element.

In the exemplary embodiment, an oxidation catalyst 308 is coupled in flow communication downstream from second duct burner 306 to facilitate oxidizing the nitric oxide (NO) to equilibrium concentrations of $NO_2$ at local exhaust temperatures at the location of oxidation catalyst 308 in the exhaust gas stream. Moreover, oxidation catalyst 308 facilitates additional oxidization of NO to one or more higher order $N_xO_y$ gases at local exhaust temperatures. More specifically, oxidation catalyst 308 is configured to oxidize NO at a first temperature that is less than a thermal regeneration temperature for the catalytic material used by oxidation catalyst 308. The $N_xO_y$ gas molecules are removed downstream from oxidation catalyst 308 by aqueous absorption or reaction. For example, the $N_xO_y$ gas molecules are soluble in water and can be removed from the exhaust gas stream by applying water using a water injection device, such as one or more spray nozzles (not shown) that are provided in exhaust stack 122 or as a standalone component in emissions treatment equipment 122 (shown in FIG. 1). In some embodiments, a water collector is provided that condenses water vapor in the exhaust gas stream to facilitate removing the $N_xO_y$ gas-heavy water. Alternatively, the $N_xO_y$ gases may be removed by exposing the exhaust gas stream to an aqueous solution such that a chemical reaction between the $N_xO_y$ gases and the solution facilitates removing the $N_xO_y$ gases from the exhaust gas stream. Moreover, the water injection device may be positioned within a HRSG 116 or downstream from HRSG 116, such as in a flue gas desulfurization (FGD) unit (not shown). Oxidation catalyst 308 facilitates an enhanced rate of $N_xO_y$ gas production and yield between approximately 400° F. and approximately 650° F. During the production of $N_xO_y$ gases, however, the oxidation catalyst may require regeneration due to fouling by exhaust gas contaminates such as $SO_x$, which may be driven off the oxidation catalyst at high temperatures. An exemplary range of temperatures for use in regeneration of the oxidation catalyst is between approximately 700° F. and approximately 1250° F. During regeneration, gas turbine engine 106 uses a second fuel to generate energy, such as a fuel having low concentrations of the contaminants to be removed during regeneration.

Furthermore, in the exemplary embodiment, HRSG 116 includes a low pressure heat exchanger 310 coupled in flow communication downstream from oxidation catalyst 308. Moreover, in the exemplary embodiment, low pressure heat exchanger 310 cools the exhaust gases to facilitate removal of the $N_xO_y$ gases from the exhaust gas stream via an aqueous absorption or reaction. In some embodiments, the water injection device may be positioned within low pressure heat exchanger 310 to facilitate removing the $N_xO_y$ gas molecules from the exhaust gas stream.

In the exemplary embodiment, a controller 312 is coupled to, for example, HRSG 116. Controller 312 controls activation and/or performance of heating element 306. For example, during a startup of combined cycle power plant 100 (shown in FIG. 1), controller 312 activates heating element 306 to heat the flow of exhaust gases to facilitate reducing $NO_x$ to, for example, NO and $NO_2$, prior to the exhaust gases being released into the atmosphere via stack 122. The startup of plant 100 may be any of a hot start, a warm start, or a cold start. Heating element 306 can operate during the purge stage of gas turbine startup. In some embodiments, controller 312 causes heating element 306 to heat the flow of exhaust gases during any transient operational phase or load or low speed, to facilitate an increased reduction of $NO_x$ by heating the exhaust gases to a temperature sufficient for $NO_x$ reduction to the desired emission level.

Moreover, and in the exemplary embodiment, controller 312 is coupled to one or more sensors (not shown) that detect the efficiency at which oxidation catalyst 308 oxidizes $NO_x$ within the exhaust gas stream. For example, during normal operation, gas turbine engine 106 uses a fuel having a high sulfur content and the temperature of the exhaust gas stream at an inlet of oxidation catalyst 308 is between approximately 400° F. and approximately 650° F. Moreover, controller 312 receives signals representative of a concentration of $NO_x$ in the exhaust gas stream at an inlet of oxidation catalyst 308 and/or at an inlet of exhaust stack 122. Based on the measured concentration, controller 312 may determine when the catalytic material used by oxidation catalyst 308 needs to be regenerated in order to maintain at least a minimum level of $NO_x$ emissions reduction. Controller 312 may determine when the catalytic material needs to be regenerated by, for example, comparing the measured $NO_x$ emissions reduction to a threshold value. The threshold value may be a lower limit to $NO_x$ emissions based on local standards or laws. Alternatively, controller 312 may activate heating device 306 when the measured $NO_x$ emissions reduction is within a predetermined percentage of the threshold value or may activate heat device 306 based on a change in $N_xO_y$ generation based on predicted NO emissions. To facilitate regenerating the catalytic material, controller 312 causes gas turbine engine 106 to stop use of the high-sulfur fuel and to switch to a low-sulfur fuel source with a low level of fuel-bound nitrogen. Moreover, controller 312 causes heat source 306 to raise the temperature of the exhaust gas stream to between approximately 700° F. and approximately 1250° F. When the catalytic material has regenerated to a level substantially above the lower limit, controller 312 deactivates heating device 306 and causes gas turbine engine 106 to return to use of the original high-sulfur fuel.

In some embodiments, the term "controller" refers generally to any programmable system including computers, systems, microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "controller."

Although the present invention is described in connection with an exemplary power generation system environment, embodiments of the invention are operational with numerous other general purpose or special purpose power generation system environments or configurations. The power generation system environment is not intended to suggest any limitation as to the scope of use or functionality of any aspect of the invention. Moreover, the power generation system environment should not be interpreted as having any dependency or requirement relating to any one or combination of components illustrated in the exemplary operating environment.

Figure 4:
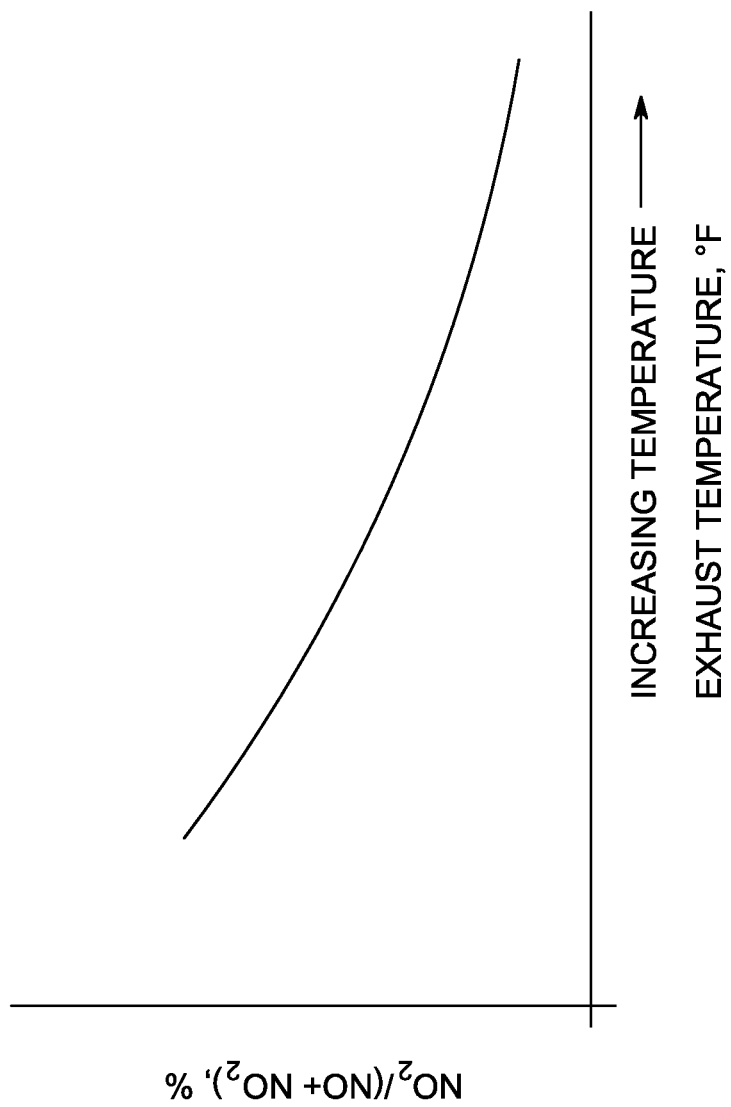
FIG. 4 is a graph that illustrates an amount of NO2 as a percentage of total $NO_x$ in an exhaust gas stream within the combined cycle power plant shown in FIG. 1.

FIG. 4 is a graph 400 that illustrates an equilibrium $NO_2$ percentage of total $NO_x$ in an exhaust gas stream for an exemplary gas turbine engine, such as gas turbine engine 106 (shown in FIG. 1). As shown in FIG. 4, a lower exhaust gas temperature facilitates a higher proportion of $NO_2$ in $NO_x$ at equilibrium. For an exhaust gas temperature of approximately 650° F., $NO_2$ makes up approximately 80% of the total $NO_x$. However, at exhaust gas temperatures above about 1100° F., $NO_2$ makes up approximately 10% of the total $NO_x$.

Figure 5:
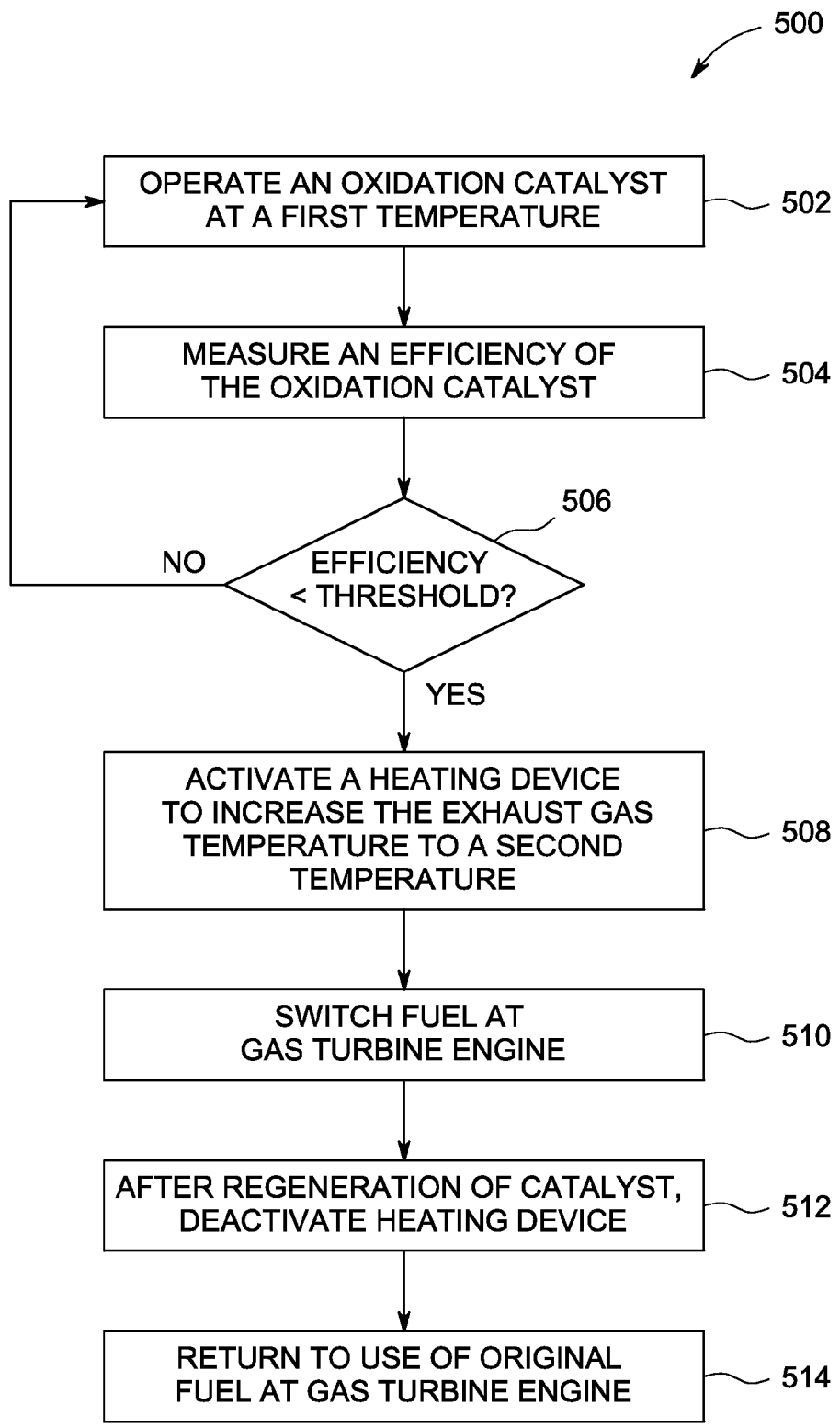
FIG. 5 is a flowchart that illustrates an exemplary method for controlling a temperature of an exhaust gas stream within the combined cycle power plant shown in FIG. 1 to facilitate regenerating an oxidation catalyst during continuous power generation.

FIG. 5 is a flowchart 500 that illustrates an exemplary method for reducing emissions in a flow of exhaust gases generated by gas turbine engine 106 (shown in FIG. 1). In the exemplary embodiment, oxidation catalyst 308 (shown in FIG. 3) is operated 502 at a first temperature to facilitate reducing an amount of $NO_x$ in the exhaust gases that are channeled into oxidation catalyst 308, wherein the first temperature is less than a thermal regeneration temperature for a catalytic material. Moreover, controller 312 (shown in FIG. 3) measures 504 an efficiency of oxidation catalyst 308 at the first temperature. In the exemplary embodiment, the first temperature is between approximately 400° F. and approximately 650° F. Moreover, controller 312 measures an amount of NO oxidation conversion to determine reactivation effectiveness and a time period necessary for regeneration of the catalytic material. In the exemplary embodiment, controller 312 compares 506 the efficiency of oxidation catalyst 308 to a threshold value. Alternatively, controller 312 compares the efficiency of oxidation catalyst 308 to a value that is within a predetermined percentage of the threshold value. Based on the comparison, controller 312 selectively activates 508 heating device 306 (shown in FIG. 3) to increase a temperature of the exhaust gases to a second temperature to facilitate regenerating the catalytic material. More specifically, to facilitate regenerating the catalytic material, controller 312 causes gas turbine engine 106 to stop use of the high-sulfur fuel and to switch 510 to a low-sulfur fuel source with a low level of fuel-bound nitrogen. Moreover, controller 312 causes heat source 306 to raise the temperature of the exhaust gas stream to between approximately 700° F. and approximately 1250° F. When the catalytic material has regenerated to a level substantially above the lower limit, controller 312 deactivates 512 heating device 306 and causes gas turbine engine 106 to return 514 to use of the original high-sulfur fuel.

Exemplary embodiments of systems, methods, and apparatus for use in reducing emissions, such as $NO_x$ emissions, are described herein. The embodiments described herein facilitate increasing a temperature of exhaust gases from a gas turbine engine by using a duct burner to enhance an ability of an oxidation catalyst to reduce the concentration of NO of the exhaust gases for subsequent adsorption to prevent emission into the atmosphere via an exhaust stack. Although the above-described embodiments are described in connection with reducing $NO_x$ reduction, it should be understood that other catalyst systems could be regenerated by same approach to remove certain contaminates such as oxides of sulfur ($SO_x$) from emission abatement catalysts used for gas turbine, boiler, and reciprocating engine after treatment.

Exemplary embodiments of systems, methods, and apparatus are described above in detail. The systems, methods, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A controller, such as those described herein, includes at least one processor or processing unit and a system memory. The controller typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for reducing emissions in a flow of exhaust gases generated by a gas turbine engine, the flow of exhaust gases including oxides of nitrogen ($NO_x$), said method comprising:

operating an oxidation catalyst at a first temperature to facilitate reducing an amount of $NO_x$ in the exhaust gases channeled into the oxidation catalyst by oxidizing the $NO_x$ to higher order $N_xO_y$ gases, wherein the first temperature is less than a thermal regeneration temperature for a catalytic material;

measuring an efficiency of the oxidation catalyst at the first temperature;

comparing the efficiency of the oxidation catalyst to a threshold value;

based on the comparison, selectively activating a heating device including at least one of a duct burner and a steam-based heating element to increase a temperature of the exhaust gases to a second temperature to facilitate regenerating the catalytic material; and contacting the exhaust gases with an aqueous solution configured to remove the higher order $N_xO_y$ gases from exhaust gases.

2. A method in accordance with claim 1, wherein measuring an efficiency of the oxidation catalyst comprises measuring an amount of oxidation conversion to determine reactivation effectiveness and a time period necessary for regeneration of the catalytic material.

3. A method in accordance with claim 1, further comprising configuring a controller to selectively activate the heating device to heat the exhaust gases to the second temperature.

* * * * *